United States Patent
Kasapi

(10) Patent No.: US 7,050,832 B2
(45) Date of Patent: May 23, 2006

(54) VARIABLE DIVERSITY TRANSMISSION IN A RADIO COMMUNICATIONS SYSTEM BASED ON CHARACTERISTICS OF A RECEIVED SIGNAL

(75) Inventor: Athanasios Agamamnon Kasapi, Palo Alto, CA (US)

(73) Assignee: ArrayComm LLC, San Jose, CA (US)

( * ) Notice: Subject to any disclaimer, the term of this patent is extended or adjusted under 35 U.S.C. 154(b) by 650 days.

(21) Appl. No.: 09/996,633

(22) Filed: Nov. 28, 2001

(65) Prior Publication Data

US 2003/0100324 A1    May 29, 2003

(51) Int. Cl.
H04B 1/38    (2006.01)

(52) U.S. Cl. ..................... 455/561.1; 455/273

(58) Field of Classification Search ............... 455/135, 455/114.2, 101, 562.1, 60, 33.1, 500, 552, 455/504, 552.1, 561.1, 13.3, 19, 63.4, 273, 455/279.1; 375/226, 332; 342/368, 373, 342/374, 378
See application file for complete search history.

(56) References Cited

U.S. PATENT DOCUMENTS

| | | | |
|---|---|---|---|
| 5,542,107 A | 7/1996 | Kay | |
| 5,574,989 A | 11/1996 | Watson et al. | |
| 5,694,131 A | 12/1997 | Baggett et al. | |
| 5,812,935 A * | 9/1998 | Kay | 370/333 |
| 5,870,681 A | 2/1999 | Myer | |
| 5,983,112 A | 11/1999 | Kay | |
| 6,058,318 A | 5/2000 | Kobayakawa et al. | |
| 6,122,260 A | 9/2000 | Liu et al. | |
| 6,205,127 B1 | 3/2001 | Ramesh | |
| 6,788,661 B1 * | 9/2004 | Ylitalo et al. | 370/334 |
| 2002/0193146 A1 * | 12/2002 | Wallace et al. | 455/562 |

OTHER PUBLICATIONS

PCT Search Report PCT/US 02/37722, Jul. 9, 2003, 4 pages.
Thompson et al., "Downlink Transmit Diversity Schemes for CDMA Networks" XP-000922334, 1999 IEEE, pp. 1382-1386.
Written Opinion, PCT/US02/37722, Jun. 24, 2004, 6 pages.

* cited by examiner

*Primary Examiner*—Nay Maung
*Assistant Examiner*—Tu X Nguyen
(74) *Attorney, Agent, or Firm*—Blakely, Sokoloff, Taylor & Zafman LLP

(57) ABSTRACT

A method and apparatus are provided that measures received radio communications signals to determine whether or what degree to use transmit diversity and beam forming. In one embodiment, the invention includes receiving a radio signal from a remote terminal at a plurality of antennas, comparing characteristics of the received signal as received at the plurality of antennas, determining whether reception of radio signals transmitted to the remote terminal is likely to be improved by diversity transmission based on the comparisons and transmitting radio signals to the remote terminal using diversity if the reception is likely to be improved.

35 Claims, 3 Drawing Sheets

VARIABLE DIVERSITY TRANSMISSION IN A RADIO COMMUNICATIONS SYSTEM BASED ON CHARACTERISTICS OF A RECEIVED SIGNAL

BACKGROUND OF THE INVENTION

1. Field of the Invention

The invention relates generally to the field of digital radio signal communications. More particularly, the invention relates to measuring received signals to determine whether to transmit using diversity.

2. Description of the Related Art

Radio communications are sensitive to the environment in which the radio signals are transmitted and received. Communications can be lost or degraded when the environment is not favorable to the type of signals being transmitted. One particular environmental problem is sometimes referred to as clutter or scattering. This problem can cause multipath interference or completely prevent reception of a transmitted signal. One known way to mitigate the effects of clutter or scattering is through receive or transmit diversity. Spatial receive diversity typically uses two receive antennas a short distance from each other. The receiver will either choose the antenna that receives the strongest signal or use an equalizer to combine the signals from both antennas. There are many different equalizer designs well known in the art. Time receive diversity uses a single antenna and searches for multipath copies of a signal delayed in time. An equalizer then combines the two or more identical signals to resolve the original single signal. Digital cellular telephones are required to have time diversity receive equalizers that can resolve signals with one to four symbols of delay spread depending on the system.

Transmit diversity works much like receive diversity in reverse. Signals can be transmitted from spaced antennas or from the same antenna at two different times. Transmit diversity schemes can enhance reception significantly under certain circumstances. However, they increase the complexity of the transmitter and, in a communications system with more than two terminals, the additional transmissions increase the amount of interference and noise for the other terminals. In addition, for some environmental conditions, diversity transmission can reduce the quality of the received signal.

BRIEF SUMMARY OF THE INVENTION

A method and apparatus are provided that measures received radio communications signals to determine whether or what degree to use transmit diversity and beam forming. In one embodiment, the invention includes receiving a radio signal from a remote terminal at a plurality of antennas, comparing characteristics of the received signal as received at the plurality of antennas, determining whether reception of radio signals transmitted to the remote terminal is likely to be improved by diversity transmission based on the comparisons and transmitting radio signals to the remote terminal using diversity if the reception is likely to be improved.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

Figure 1:
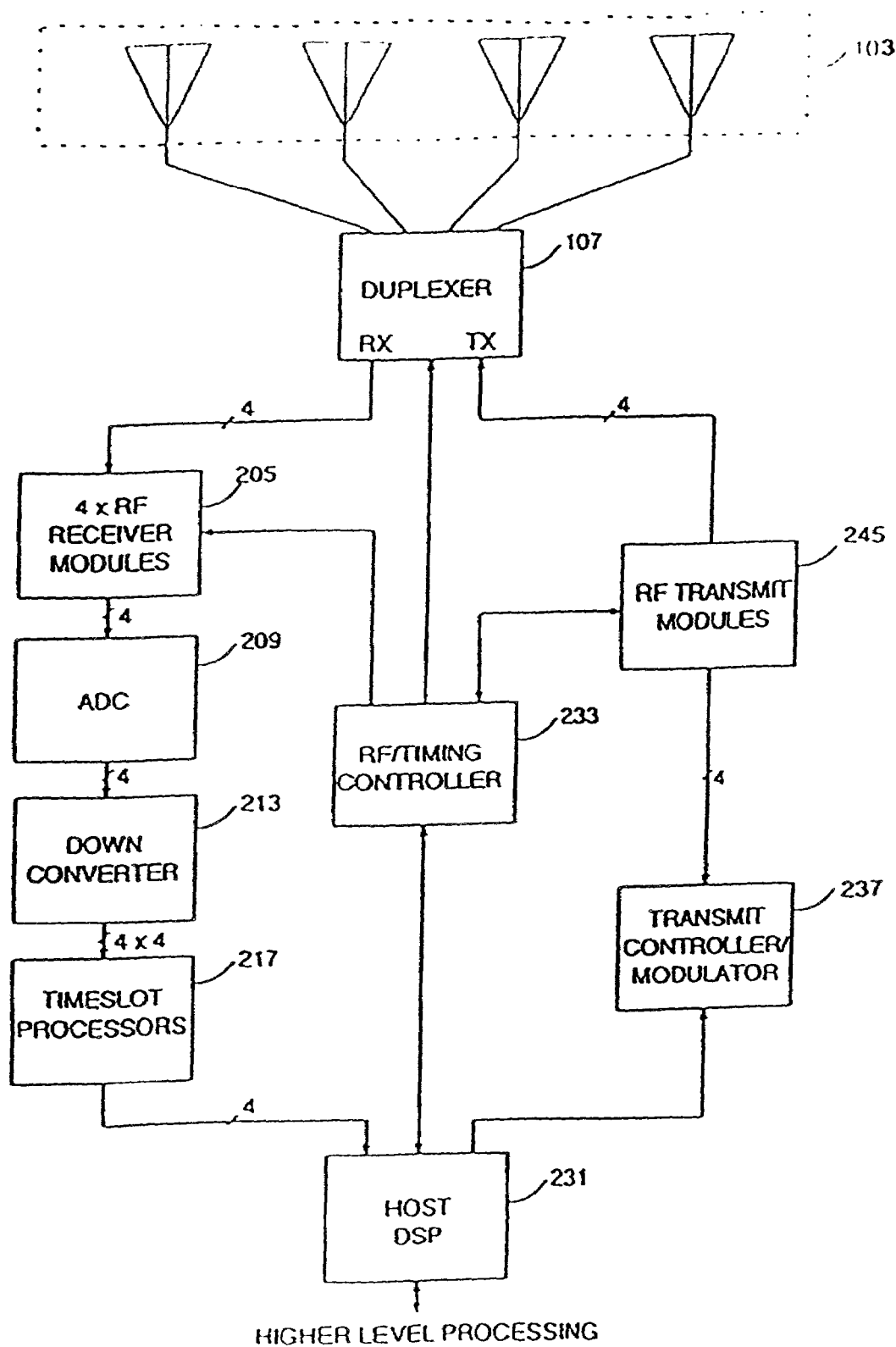
FIG. 1 is a simplified block diagram of a base station on which an embodiment of the invention can be implemented.

In one embodiment, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Extended Kalman filters or other types of linear filters, well known in the art, can be used to exploit the properties of the training sequences in determining spatial parameters. Further details regarding the use of spatial division and SDMA systems are described, for example, in U.S. Pat. No. 5,828,658, issued Oct. 27, 1998 to Ottersten et al. and U.S. Pat. No. 5,642,353, issued Jun. 24, 1997 to Roy, III et al.

Notwithstanding the great benefits of spatial division communications systems, in environments with high clutter or scattering, the delayed multipath signals can interfere with the beam forming aspects of the spatially directed beam. As a result, a precisely directed signal may not be received clearly when an omni-directional beam will be. Such high clutter conditions, however, are typically very well suited to diversity transmission. In addition, the spatial division hardware with multiple transmit chains and multiple antennas can easily be adapted to provide transmit diversity. In a spatial division mode, the transmit chains are designed to each transmit a copy of the communications signal, each with a different amplitude and a different phase or delay. This is how the spatial signature is typically applied to beam forming. By changing this set of transmission weights, the spatial division antennas can be used as transmission diversity antennas. A variety of different diversity transmission schemes are possible as discussed below.

The spatial division system is also very well suited to determining when transmission or delay diversity is required. In a typical spatial division system, the signal from each receive chain is measured and the relative phases and amplitudes for each receive chain are determined. This determination is used to determine a spatial signature for the terminal from which the signal was received. However, the measured phases or amplitudes or both can also be used directly to determine the nature of the radio environment. When the measurements indicate that diversity transmission should be used, then the transmission mode can be switched accordingly. Other tests can also be applied to make this determination either in combination or separately from the phases and amplitudes.

Base Station Structure

The present invention relates to wireless communication systems and may be a fixed-access or mobile-access wireless network. The present invention can be implemented more easily using spatial division multiple access (SDMA) technology, however, an SDMA system is not required. The system may be any type of multiple access system, such as time division multiple access (TDMA), frequency division multiple access (FDMA) and code division multiple access (CDMA). Multiple access can be combined with frequency division duplexing (FDD) or time division duplexing (TDD). FIG. 1 shows an example of a base station of a wireless communications system or network suitable for implementing the present invention. The system or network includes a number of subscriber stations, also referred to as remote terminals or user terminals, such as that shown in FIG. 2. The base station may be connected to a wide area network (WAN) or a mobile telephone switching office (MTSO) through its host DSP 231 for providing any required data services and connections external to the immediate wireless system. To support spatial division, a plurality of antennas 103 is used, for example four antennas, although other numbers of antennas may be selected.

The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via the switch 107 to a receiver 205, and are mixed down in analog by RF receiver ("RX") modules 205 from the carrier frequency to an FM intermediate frequency ("IF"). This signal then is digitized (sampled) by analog to digital converters ("ADCs") 209. Only the real part of the signal is sampled. Final down-converting to baseband is carried out digitally. Digital filters can be used to implement the down-converting and the digital filtering, the latter using finite impulse response (FIR) filtering techniques. This is shown as block 213. The invention can be adapted to suit a wide variety of RF and IF carrier frequencies and bands.

There are, in the present example, four down-converted outputs from each antenna's digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola 56300 Family DSPs can be used as timeslot processors, one per receive timeslot. The timeslot processors 217 monitor the received signal power and estimate the frequency offset and time alignment. They also determine smart antenna weights for each antenna element. These are used in the spatial division multiple access scheme to determine a signal from a particular remote user and to demodulate the determined signal.

The output of the timeslot processors 217 is demodulated burst data for each of the four receive timeslots. This data is sent to the host DSP 231 whose main function is to control all elements of the system and interface with the higher level processing, which is the processing which deals with what signals are required for communications in all the different control and service communication channels defined in the system's communication protocol. The host DSP 231 can be a Motorola 56300 Family DSP. In addition, timeslot processors send the determined receive weights for each user terminal to the host DSP 231.

The host DSP 231 maintains state and timing information, receives uplink burst data from the timeslot processors 217, and programs the timeslot processors 217. In addition it decrypts, descrambles, checks error correcting code, and deconstructs bursts of the uplink signals, then formats the uplink signals to be sent for higher level processing in other parts of the base station. With respect to the other parts of the base station, it formats service data and traffic data for further higher processing in the base station, receives downlink messages and traffic data from the other parts of the base station, processes the downlink bursts and formats and sends the downlink bursts to a transmit controller/modulator, shown as 237. The host DSP also manages programming of other components of the base station including the transmit controller/modulator 237 and the RF/timing controller shown as 233.

The RF/timing controller 233 interfaces with the RF transmit system, shown as block 245 and also produces a number of timing signals that are used by both the RF system and the modem. The RF/timing controller 233 reads and transmits power monitoring and control values, controls the duplexer 107 and receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. Specifically, the received transmit data from the host DSP 231 are converted into a complex modulated signal, up-converted to an IF frequency, 4-times over-sampled, multiplied by transmit weights obtained from host DSP 231, and converted via digital to analog converters ("DACs") which are part of transmit controller/modulator 237 to analog transmit waveforms. The analog waveforms are sent to the transmit modules 245.

The transmit modules 245 up-convert the signals to the transmission frequency and amplify the signals. The amplified transmission signal outputs are sent to antennas 103 via the duplexer/time switch 107.

The design of the base station hardware is shown as an example, the invention can be implemented using a great variety of different hardware systems and can also be implemented using general purpose hardware. While the hardware system illustrated is believed to be well-suited to the present invention, it is not required.

User Terminal Structure

Figure 2:
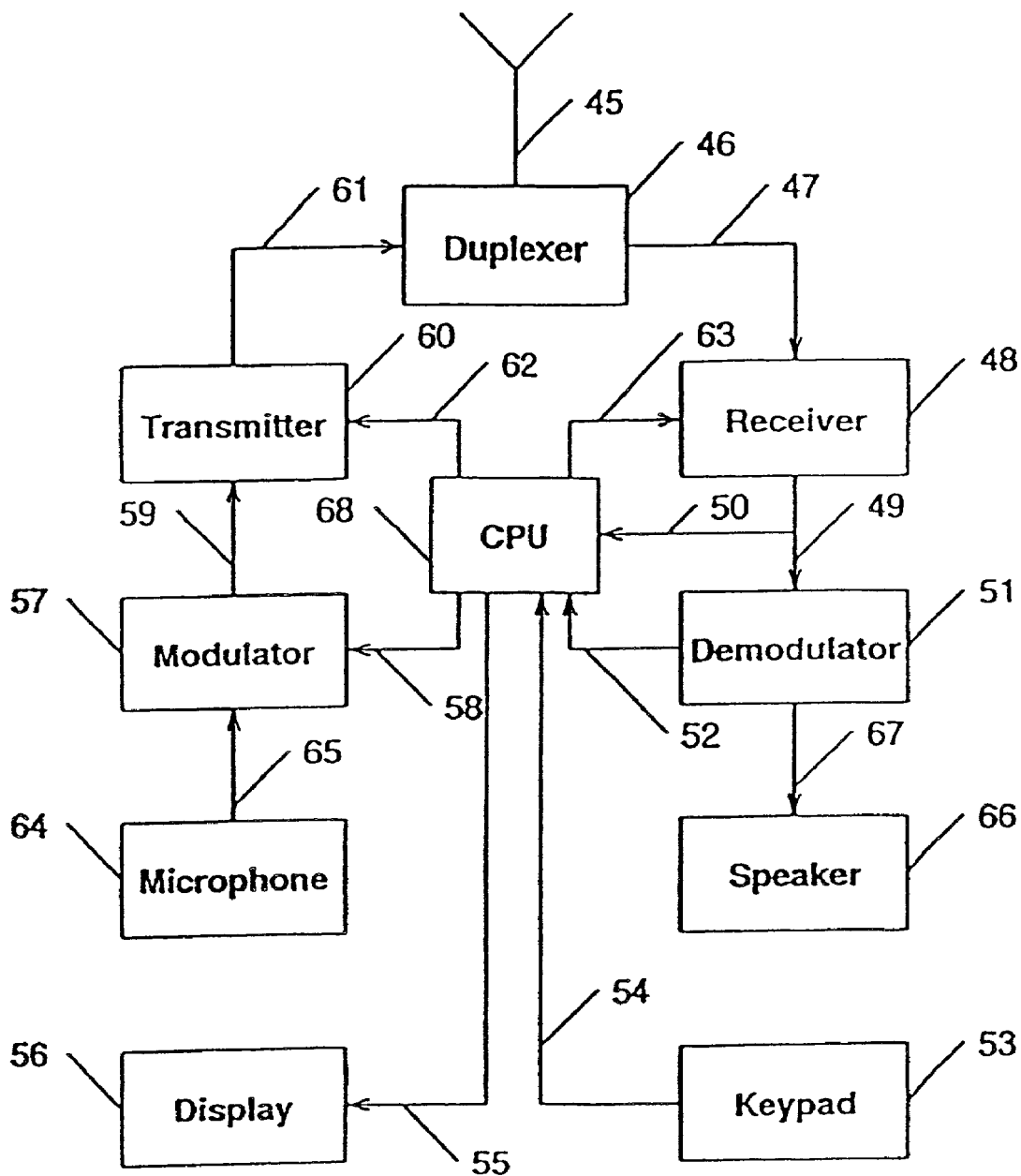
FIG. 2 is a block diagram of a remote terminal on which an embodiment of the invention can be implemented.

FIG. 2 depicts an example component arrangement in a remote terminal that provides data or voice communication in communication with the base station of FIG. 1. The remote terminal's antenna 45 is connected to a duplexer 46 to permit antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division diversity is used, a transmit/receive (TR) switch can be used instead of a duplexer as is well-known in the art. The duplexer output 47 serves as input to a receiver 48. The receiver 48 produces a down-converted signal 49 which is the input to a demodulator 51. A demodulated received sound or voice signal 67 is input to a speaker 66. In a data system, the demodulated signal is processed by the CPU or sent to other components (not shown).

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications.

The remote terminal's voice signal to be transmitted 65 from the microphone 64 is input to a modulator 57. Traffic and control data to be transmitted 58 is supplied by the remote terminal's CPU 68. Control data 58 is transmitted to base stations during registration, session initiation and termination as well as during the session as is well-known in the art.

In an alternate embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

In many systems, the user terminal is required to incorporate a capability to demodulate a received signal even when this signal contains delayed copies (echoes) of the nominal signal expected from the base station. Most cellular telephone standards, for example, include such a requirement. According to such standards, the equalizer is required to demodulate a signal that contains one or more echoes spaced from one to ten symbols apart. The specific requirements vary depending on the standard involved. The delay, often expressed in terms of symbols for a particular standard, is typically in a range of from one quarter to twice a time equal to 1/B where B is the bandwidth of the traffic channel. This capability is normally provided by an adaptive channel equalization filter in the CPU 68 or demodulator 51. A trellis decoder, such as a Vitterbi decoder, can be used as is well-known in the art.

Even with the delay equalizer, the performance of the demodulator is impaired by signal echoes, compared to the same energy concentrated in a non-echoed signal. The equalizer limits but does not eliminate this impairment. The sensitivity of the demodulator to a signal of two equal-strength delayed components can be impaired by 2 dB as compared to the same signal with no echoes. As a result, transmitting with delay diversity can seriously impair reception by the user terminal in a clean radio channel that performs similarly to a line-of-sight channel. On the other hand, when the received spatial signature indicates that the channel is far from resembling a line-of-sight channel, the equalizer can be exploited to boost the robustness and the performance of a single signal. The equalizer can be used to overcome fades, multi-path and other problems. When the user terminal is far from line-of-sight, the base station can transmit the non-delayed and the delayed copies of the signal with roughly equal strength. This same far from line-of-sight condition is also one in which beam forming is least effective. So, while transmitting with delayed copies can interfere with beam forming, the impact on beam forming is very small because beam forming is relatively ineffective. For the line-of-sight channel, the benefits of beam forming can be fully exploited and delayed copies can be suppressed at the same time.

Process Flow

As described above, the conditions under which delay diversity techniques are least effective is when the delayed and non delayed copies of the signal are received with equal strength. This usually corresponds to a physical environment where the signal travels from the base station to the remote terminal directly, free from significant reflection or scattering. This type of physical environment is the type of physical environment in which spatial division techniques usually work best. Adaptive array, smart antenna or spatial division base stations can determine if the remote is in such a line-of-sight environment by examining the spatial signature of the remote at the receive array. That is, the set of relative amplitudes and phases with which the signal is received from the remote at each base station antenna can indicate if a significant amount of scattering is present. In the event that it is determined that the signal arrives from the remote relatively free from scattering, delay diversity can be turned off. At the same time, beam forming for spatial division can be turned on. In the event that scattering is detected, delay diversity can be turned on. By the same token, beam forming can be turned off, however, combining beam forming with delay diversity can also provide advantages.

Similarly, the base station can control the relative strength of the delayed signal copies in its delay diversity scheme in order to provide optimum performance at the remote terminal. The base station can also actively vary the relative strength of the differently delayed transmit signals.

Figure 3:
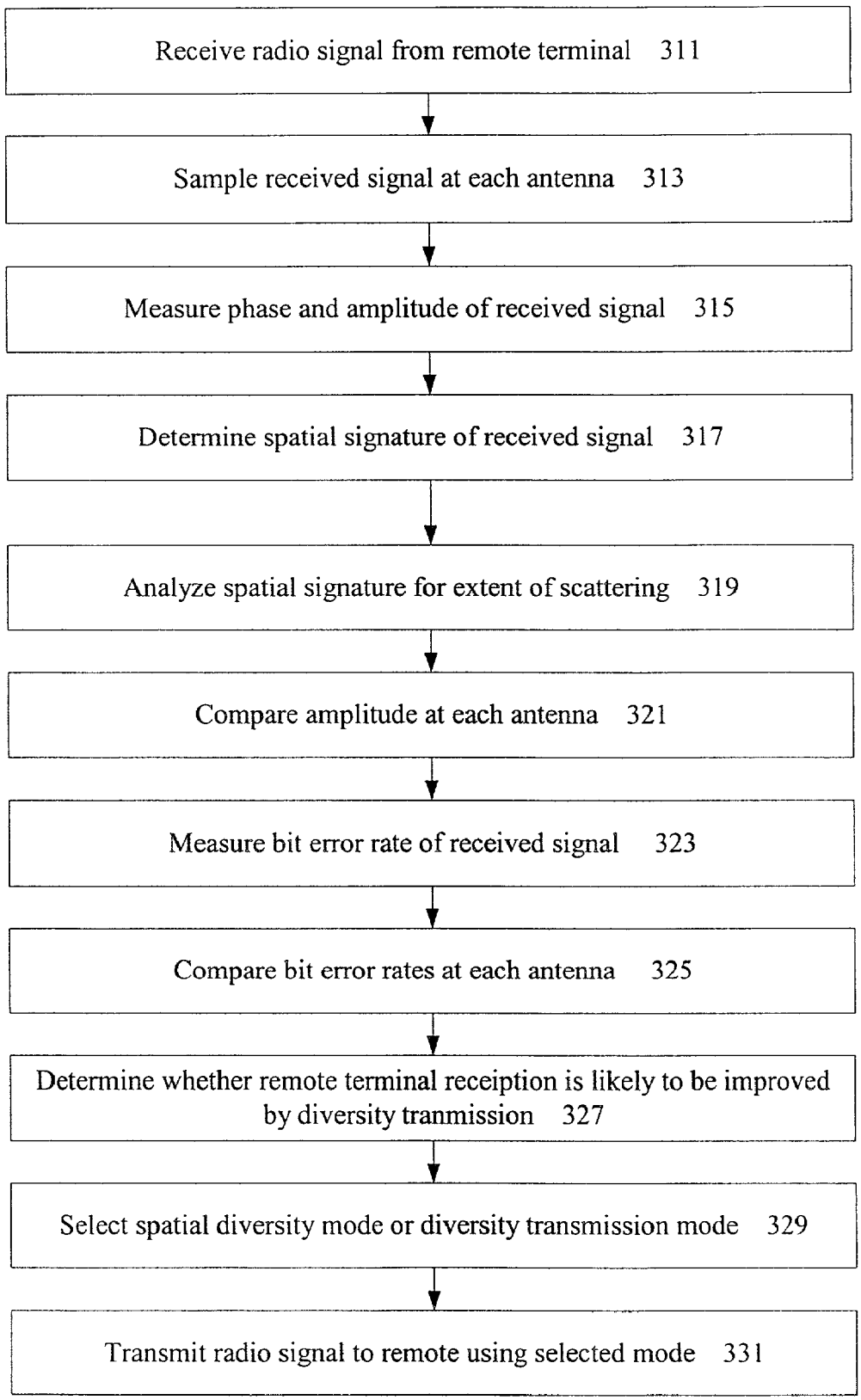
FIG. 3 is a flow chart showing one embodiment of the present invention.

Referring to FIG. 3, in the course of a radio signal communications exchange with the remote terminal, a base station will receive radio signals from the remote terminal 311. As mentioned above, the signals are sampled at each antenna 313. The phase and amplitude of the receive signal can be measured 315 based on the samples and from these measurements, using procedures well known in the art, a spatial signature can be determined for the received signal 317. This process is the same as the process that would be performed to receive, demodulate and decode a remote terminal transmission in a spatial division system. As a result, in a spatial division system, the present invention can use the analysis which has already been performed by the base station to determine whether or not to apply beam forming or delay diversity. This synergistic effect increases the efficiency and the speed with which the determination can be made. Having determined a spatial signature, the spatial signature of the remote terminal can be analyzed to determine the extent of the scattering.

As an alternative or an additional test, the system can compare the amplitudes received at each antenna. This can be done using the data from the spatial signature or separately calculated based on the measured amplitudes of the received signal at each antenna. Relatively consistent amplitudes at each antenna suggest a clean line-of-sight signal with minimal fading. Great differences in the amplitudes suggest a significant amount of scattering and multi-path interference.

Another additional or alternative test is to measure the bit error rate (BER) of the received signal 323. The bit error rate can be obtained from the decoding process of the received signal in the regular traffic flow. Typically, the communication signals are transmitted with some kind of error correcting or detecting code that is used to generate a value representative of the BER. For further accuracy, the bit error rates at each antenna can be compared as a measure of scattering or multi-path interference. Consistent bit error rates at each antenna suggest a clear signal path. Diverging bit error rates suggest significant scattering.

Having performed one or more of these tests, the base station can determine whether the remote terminal reception is likely to be improved by diversity transmission 327. If reception is likely to be improved then a diversity transmission mode can be selected 329. In which case, the radio signals will be transmitted using a transmit diversity mode 331. This can be done by completely switching modes or, as described below, it can be done by applying weights to delayed signal copies or simultaneous signal copies that will increase the amount of transmit diversity. Alternatively, if diversity transmission will not improve reception at the remote then a spatial division mode can be selected 329 and radio signals can be transmitted 331 using beam forming based on spatial signatures. The beam forming can also be varied by applying weights that progressively concentrate the RF (radio frequency) energy in a particular direction. As will be understood in the art, the thresholds for these decisions can be set with some hysteresis. Typically, the thresholds will also be set to prefer beam forming, since the spatial division system reduces interference with other remote terminals.

In one embodiment, the base station has both a beam forming mode and a diversity transmission mode and determines, based on these measurements, which mode to employ. The base station will employ either one or the other of the modes as alternatives to each other. In another embodiment, the base station does not use spatial diversity for beam forming but transmits omni-directionally or by sectors in a conventional fashion. The diversity transmission mode can then be engaged as a supplement to the conventional omni-directional or sector transmission. As an alternative embodiment, the present invention can be applied to a system that does not support delay diversity or the diversity transmission mode. In this case, the tests can be used to determine whether or not beam forming is supported by the RF channel. If reception can be improved by reducing the amount of beam forming, then spatial division can be turned off and omni-directional or widespread signals can be used. Alternatively, in environments with sufficiently low level of multi-path interference, bean forming can be turned on to support spatial division.

The diversity transmission of the present invention can be accomplished in a variety of different ways. As mentioned above, using the spatial division multiple antenna transmit chains, a transmit signal can be sent first through one transmit antenna chain and then through another transmit antenna chain. This process can be repeated until the signal has been transmitted through all of the transmit antenna chains. In the example of FIG. 1, this would result in four separate transmissions of the data, once through each of the four transmit antennas. As an alternative, all four antennas can be used simultaneously to transmit copies of the signal which are delayed in time. The amount of time delay to apply to the signals can be selected to best utilize the capabilities of the remote terminal's transmitter. In a GSM (Globale Systeme Mobile) system, the second signal would be sent three or four symbols later than the first signal. With DAMPS (Digital Advanced Mobile Phone Service), the delayed signal would be sent approximately one symbol after the original signal. In general, the delay will be selected to be large enough to decorrelate the two separate wave forms, yet close enough to allow the two wave forms to be combined at the receiver. Antenna and delay diversity can also be combined in the diversity transmission mode as is well known in the art.

In an SDMA system, a further diversity choice is possible using the spatial division antenna system, the two versions of the signal can be sent simultaneously or with a time delay using different spatial signatures. In other words, the beam forming capability of the antenna system can be used to direct energy of the transmitted wave form in different directions. This approach reduces the total amount of energy that is transmitted by the antenna system and yet allows signals to be transmitted along different propagation paths. As with the other diversity schemes, this signal can be transmitted in two or more copies. Such a spatial division diversity transmission scheme is tantamount to sending the signal from the diversity antennas with two different phase and amplitude signatures.

In another embodiment, the mode switching, between beam forming and delay diversity, need not be a hard switch that operates in either one mode or the other but not both. Instead, the weighting coefficients can be continuously adjusted to optimize the transmitted signal based on the characteristics of the received signal.

As an example, the baseband representation of the signal transmitted from an array of N antennas can be expressed as $S(t)=S_1(t)+S_2(t)+S_3(t)+\ldots+S_N(t)$. The signal from antenna "n" in the array of N antennas where n ranges from 1 to N can be expressed as:

$$S_1(t)=a_n s(t)+b_n s(t-T)+c_n s(t-2T)+\ldots$$

where $a_n$, $b_n$, $c_n$ ... are weighting coefficients for each delayed version of the signal. The number of terms a, b, c . . . will depend on the particular application. Two terms has been found to be sufficient for a typical urban cellular radio data telephony system. The coefficients are expressed as complex numbers where the real part is the magnitude (or amplitude) and the imaginary part is the phase, and where T is the time interval between the delayed copies of the signal and can be at least as large as (¼)(1/B), where B is the bandwidth of the modulated waveform of the information-bearing signal S(t).

Using the characteristics of the signal received from the user terminal at one or more of the N antennas of the array, the magnitude and phase of the coefficients $a_n$, $b_n$, ... can be continuously adjusted in order to deliver maximum power to the intended user terminal and in order to deliver a minimum of power to all the other user terminals that are sharing the system. There are several alternative ways to select the coefficients. A few possibilities are described below:

If the signal received from the user terminal at one antenna varies in amplitude or phase over time in a manner inconsistent with the intrinsic characteristics of the signal transmitted from the mobile terminal, then the relative magnitude of $b_n$, $c_n$, ... is made larger. This has the effect of turning on the delay diversity. As the inconsistency increases, the coefficients for further delayed copies ($c_n$, $d_n$, ...) can be made still larger.

If the relative magnitude or the relative phase or both of the signals received from the user terminal at the receive antennas suggests a wide spread of angles of signal arrival from the user terminal, then the relative magnitude of $b_n$ can be made larger. This relative measurement can be made by comparing the magnitude and phase of the signal as received at each of the receive antennas. Conversely, if the relative magnitude or relative phase of the signal received from the user terminal at the receive antennas suggests a narrow spread of angles of signal arrival from the user terminal, then the relative magnitude of $b_n$ is made smaller.

If the signal received at one of the antennas contains delayed copies of the signal transmitted from the user terminal, then the relative magnitude of $b_n$ can be made smaller. This reduces the delay diversity and allows signals to be transmitted with a strong spatial signature. In practice, if a user terminal does not transmit with delay diversity but the signal is received with delayed copies, then the delayed copies are created by the path between transmitter and receiver. It is then likely that the same path in reverse will produce delayed copies of a single signal transmitted from the base station when received by the user terminal. Any delay diversity introduced by the transmitter is redundant. In addition, if delay diversity is applied too heavily, then there may be too many delayed copies of the signal for the user terminal to easily resolve. In one embodiment, delayed copies are considered where the delay exceeds (¼)(1/B), i.e. one quarter of the reciprocal of the bandwidth of the modulated waveform of the radio signal.

The procedures suggested above for determining relative amplitudes of an and $b_n$, are complemented by many possible different procedures for choosing the associated phases. In one embodiment, the phases for the first signal and the delayed copy are chosen from the components of the array manifold which contribute significant energy to the uplink spatial signature. The array manifold can be thought of as the set of possible spatial signatures from a single direction of arrival portion of a signal.

A particular example can be used to illustrate the principles described above. In one example, the antenna array consists of four independent patch antennas, as shown in FIG. 1. The antennas are all co-aligned in a linear array to support a single sector of a tri-sectored site. Signals from the user terminal are received by these antennas, and the relative amplitude and phase (i.e. the spatial signature) of the user terminal signal at the four antennas is calculated.

For GSM systems, the spatial signature can be calculated by coherently down-converting the signal at each antenna to baseband or near baseband, using e.g. a heterodyne-type receiver, and then simultaneously digitizing the down-converted signals. In GSM systems, a certain portion of the signal transmitted by the user terminal is known. Each sampled signal can be compared or correlated against this known signal to determine the phase and amplitude by which the known signal is scaled. The resulting four scale factors, one for each antenna, can be used as the spatial signature of the signal at the array. Each factor has a phase component and an amplitude or magnitude component.

In this embodiment, the spatial signature, regardless of how it is determined, can then be compared to entries in a table of spatial signatures. In this table each entry corresponds to the spatial signature that would be observed from a unidirectional signal, and there is an entry for each of several different directions. The comparison can be performed, for example, by calculating the normalized inner product, $I_{normalized}$, of the observed spatial signature for the four antenna system, $e=(e_1, e_2, e_3, e_4)$ with the an entry of the table $f=(f_1, f_2, f_3, f_4)$ as follows:

$$I_{normalized}(e,f)=|(e_1{}^*f_1+e_2{}^*f_2+e_3{}^*f_3+e_4{}^*f_4)|/((e_1{}^*e_1+e_2{}^*e_2+e_3{}^*e_3+e_4{}^*e_4)^{1/2}(f_1{}^*f_1+f_2{}^*f_2+f_3{}^*f_3+f_4{}^*f_4))$$

where $|e_n|$ indicates the absolute value of $e_n$, and $e_n{}^*$ indicates the complex conjugate of $e_n$. As described above the spatial signature terms $e_n$ and $f_n$ each have an amplitude component and a phase component. For mathematical convenience, they can be viewed as complex numbers where the amplitude is the real part and the phase is the imaginary part.

If the largest such inner product $I_{max}$, corresponding to a spatial signature e is above some threshold D, then the signal transmitted by the base station toward the user terminal will consist of a single delay component, i.e. there will be only one signal and no echoes, and the weights applied to the antennas will be calculated from the spatial signature of the received signal. For example, D=0.8 has been found to be a reasonable threshold in a GSM cellular telephone system and the weights can correspond to the complex conjugates of the spatial signature, pre-compensated for any phase or amplitude distortion in the transmit chain of each antenna. In order to eliminate any echoes, the weighting coefficients $a_n$, $b_n$, $c_n$, etc. are all set to zero except for one. In order to reduce delays in the transmission, typically the first non-delayed signal is transmitted, so $a_n$ will be set to one and the other coefficients to zero.

If the largest such inner product $I_{max}$, corresponding to a spatial signature e is below the threshold D, then delay diversity is gradually added. The weighting coefficient $a_n$ in this case is set to the spatial signature of the table entry with the largest normalized dot product with the user terminal spatial signature. The coefficient $b_n$ is set proportional to a table entry with a normalized spatial signature greater than some other threshold D2; for example, D2=0.7 is reasonable. If there is more than one such entry, it can be chosen randomly from the candidate set. The correlation value with this entry can be denoted by $I_{delay}$ and its spatial signature can be denoted by $a_{delay}$.

In a two signal system, without further weights $c_n$, $d_n$, ..., the proportionality factor |b|/|a| between the two weighting coefficients can be chosen so that |b|/|a| is reasonable. That is, in greatly scattering environments, the ratio |b|/|a| should be near one, while in only marginally scattering environments, it should be close to zero. One method to select the proportionality $|b|/|a|$ is to choose $|a|=1$, and determine $|b|$ as follows:

$$|b|=|a|(I_{delay}-I_{Normalized}(a_{max}, a_{delay}))/(I_{max}-I_{Normalized}(a_{max}, a_{delay}))$$

That is, the amount by which $I_{delay}$ exceeds the normalized dot product between $a_{max}$ and $a_{delay}$, normalized to the case where $I_{max}$ equals $I_{delay}$. This formula produces the desirable result that if $I_{delay}=I_{Normalized}(a_{max}, a_{delay})$ then b is chosen to be zero, while if $I_{delay}=I_{max}$, b is chosen to be equal in magnitude to a. Having determined the appropriate weighting coefficients, any correction required to control the actual signal transmitted from each antenna is applied to the weights a and b, and the delay diversity signal is transmitted.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits, such as a DSP programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless cellular data system for mobile remote terminals, it can be applied to a wide variety of different wireless systems in which data is exchanged. Such systems include voice, video, music, broadcast and other types of data systems with or without external connections. Any actions described as being performed by the base station can be performed by the remote terminal. It is also not necessary that there be a base station and a remote, peer to peer, master to slave and client to server communications can also be supported. The present invention can be applied to fixed user terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   receiving a version of a radio signal from a remote terminal at each of a plurality of antennas of a base station;
   comparing characteristics of the received versions of the remote terminal signal received at the plurality of antennas;
   using the comparison to determine whether reception at the remote terminal of radio signals transmitted from the base station to the remote terminal is likely to be improved by diversity transmission from the base station;
   selecting to use diversity transmission for radio signals transmitted from the base station to the user remote terminal if reception at the remote terminal is likely to be improved;
   setting transmit weights for a first signal and at least one delayed diversity signal copy based on the determining so that the delayed diversity signal copy receives a weight of greater magnitude if the reception is likely to be improved and a weight of lesser magnitude if the reception is not likely to be improved; and
   transmitting radio signals to the remote terminal based on the setting.

2. The method of claim 1, wherein comparing characteristics comprises determining a spatial signature of the received signal.

3. The method of claim 2, wherein comparing characteristics comprises determining relative phases and amplitudes of the received signal.

4. The method of claim 1, wherein determining comprises estimating an amount of scattering of the received signal.

5. The method of claim 1, wherein determining comprises estimating a level of multipath interference.

6. The method of claim 1, wherein transmitting comprises transmitting a radio signal from two different spaced apart antennas.

7. The method of claim 1, wherein transmitting comprises transmitting a radio signal from the plurality of antennas with two different phase and amplitude signatures.

8. The method of claim 1, wherein transmitting comprises transmitting a radio signal from the plurality of antennas with two different sets of beam forming weights.

9. The method of claim 1 wherein transmitting comprises setting transmit weights for a first signal and at least one delayed diversity signal copy based on the determining so that the delayed diversity signal copy receives a weight of greater magnitude if the reception is likely to be improved and a weight of lesser magnitude if the reception is not likely to be improved.

10. The method of claim 9 wherein transmitting further comprises transmitting using a spatial signature for the first signal and the at least one delayed diversity signal copy.

11. The method of claim 1, wherein the received radio signal conforms to a standard for at least one of TDMA, GSM, DAMPS, CDMA, FDMA and TDD.

12. A method comprising:
   receiving a radio signal from a remote terminal at a base station;
   measuring characteristics of the signal received from the remote terminal;
   selecting an amount of beam forming and an amount of transmit diversity to be applied to signals transmitted from the base station to the remote terminal using the measured characteristics of the signal received from the remote; and applying weighting coefficients to a first transmitted signal and a delayed copy of the first transmitted signal based on the selection, the amount of transmit diversity being greater as the magnitude of the weights are made more equivalent.

13. The method of claim 12, wherein selecting comprises estimating a spatial signature of the received signal by comparing relative phases and amplitudes of the received signal as received at a plurality of antennas.

14. The method of claim 12, wherein selecting comprises estimating an amount of scattering of the received signal.

15. The method of claim 12, wherein selecting comprises determining a level of multipath interference.

16. The method of claim 12, wherein selecting comprises measuring a signal quality of the received signal.

17. The method of claim 16 wherein selecting further comprises measuring a signal quality of the received signal as received at a plurality of antennas and comparing the measured signal qualities to each other.

18. The method of claim 12, wherein measuring further comprises measuring the received signal amplitude at a plurality of antennas and wherein selecting comprises comparing the measured amplitudes to each other.

19. The method of claim 1 wherein the delayed copy is transmitted from an antenna spaced apart from the antenna that transmits the first transmitted signal.

20. The method of claim 1, wherein the delayed copy is delayed by at least the duration of one quarter of the reciprocal of the bandwidth of the modulated waveform of the radio signal.

21. The method of claim 12 wherein selecting comprises choosing one of either beam forming or transmit diversity to be applied to the transmitted signal.

22. The method of claim 12, wherein the received radio signal conforms to a standard for at least one of TDMA, GSM, DAMPS, CDMA, FDMA and TDD.

23. A machine-readable medium having stored thereon data representing instructions which, when executed by a machine, cause the machine to perform operations comprising:

receiving a version of a radio signal from a remote terminal at each of a plurality of antennas of a base station;

comparing characteristics of the received versions of the remote terminal signal received at the plurality of antennas;

using the comparison to determine whether reception at the remote terminal of radio signals transmitted from the base station to the remote terminal is likely to be improved by diversity transmission from the base station;

selecting to use diversity transmission for radio signals transmitted from the base station to the user remote terminal if reception at the remote terminal is likely to be improved;

applying weighting coefficients to a first transmitted signal and a delayed copy of the first transmitted signal, the amount of transmit diversity being greater as the magnitude of the weights are made more equivalent; and transmitting radio signals to the remote terminal based on the selection.

24. The medium of claim 23, wherein the instructions for comparing characteristics comprise instructions which, when executed by the machine, cause the machine to perform further operations comprising determining relative phases and amplitudes of the received signal.

25. The medium of claim 23, wherein the instructions for transmitting comprise instructions which, when executed by the machine, cause the machine to perform further operations comprising transmitting a radio signal at two different times, the times being spaced by at least the duration of one quarter of the reciprocal of the bandwidth of the modulated waveform of the radio signal.

26. The medium of claim 23, wherein the instructions for transmitting comprise instructions which, when executed by the machine, cause the machine to perform further operations comprising transmitting a radio signal from the plurality of antennas with two different sets of beam forming weights.

27. A machine-readable medium having stored thereon data representing instructions which, when executed by a machine, cause the machine to perform operations comprising:

receiving a radio signal from a remote terminal at a base station;

measuring characteristics of the signal received from the remote terminal;

selecting an amount of beam forming and an amount of transmit diversity to be applied to signals transmitted from the base station to the remote terminal using the measured characteristics of the signal received from the remote terminal;

applying weighting coefficients to a first transmitted signal and a delayed copy of the first transmitted signal, the amount of transmit diversity being greater as the magnitude of the weights are made more equivalent.

28. The medium of claim 27, wherein the instructions for selecting comprise instructions which, when executed by the machine, cause the machine to perform further operations comprising estimating a spatial signature of the received signal by comparing relative phases and amplitudes of the received signal as received at a plurality of antennas.

29. An apparatus comprising:

a plurality of antennas at a base station to each receive a version of a radio signal from a remote terminal; and a processor to compare characteristics of the received versions of the remote terminal signal as received at the plurality of antennas, to determine, using the comparison, whether reception by the remote terminal of radio signals transmitted from the base station to the remote terminal is likely to be improved by diversity transmission, to select diversity transmission for radio signals to be transmitted from the base station to the remote terminal if the reception is likely to be improved, and to apply weighting coefficients to a first transmitted signal and a delayed copy of the first transmitted signal, the amount of transmit diversity being greater as the magnitude of the weights are made more equivalent.

30. The apparatus of claim 29, wherein comparing characteristics comprises determining a spatial signature of the received signal.

31. The apparatus of claim 29 further comprising two different spaced apart antennas from which to transmit radio signals with diversity.

32. The apparatus of claim 29 wherein the diversity transmission comprises a first signal and at least one delayed copy of the first signal.

33. The apparatus of claim 29, wherein the apparatus is comprised in at least one of a TDMA, a GSM, a DAMPS, a CDMA, a FDMA and a TDD radio communications system.

34. An apparatus comprising:
- a receive array at a base station to receive a radio signal from a remote terminal;
- a processor at a base station to measure characteristics of the signal received from the remote terminal and to select one of either beam forming or transmit diversity to be applied to signals transmitted from the base station to the remote terminal using the measured characteristics of the signal received from the remote terminal.

35. The apparatus of claim 34, wherein the apparatus is comprised in at least one of a TDMA, a GSM, a DAMPS, a CDMA, a FDMA and a TDD radio communications system.

* * * * *